(No Model.)
J. J. RICHARDSON.
BROILER FOR RANGES.
No. 332,558. Patented Dec. 15, 1885.
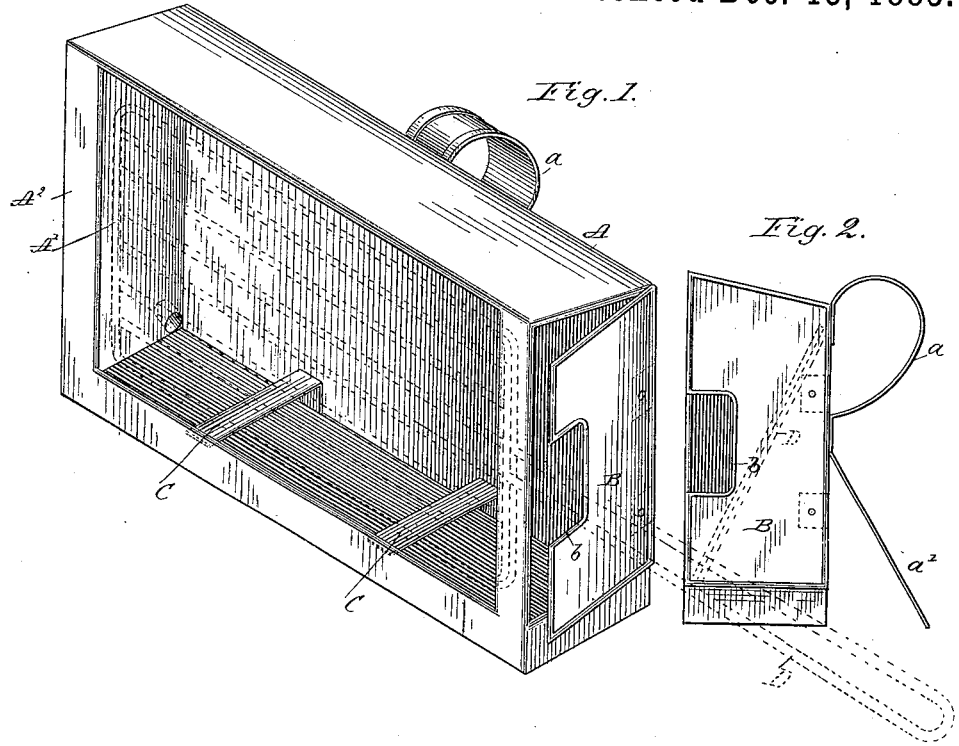
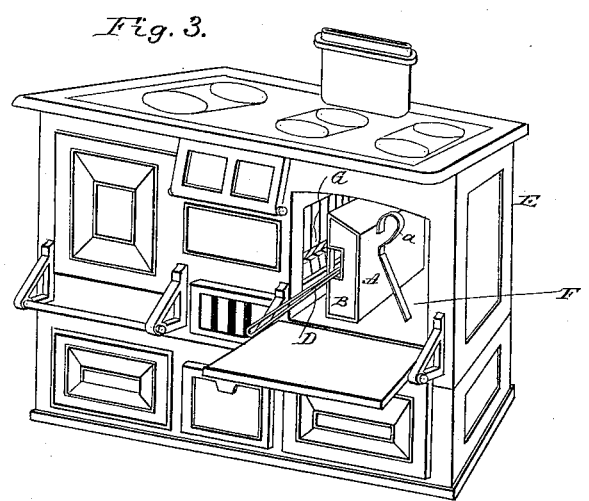
Witnesses:
Ernest Abshagen
Charles C. Buckley
Inventor:
J. J. Richardson
By his Attorneys: Knight Bros.

UNITED STATES PATENT OFFICE.

JEREMIAH J. RICHARDSON, OF NEW YORK, N. Y.

BROILER FOR RANGES.

SPECIFICATION forming part of Letters Patent No. 332,558, dated December 15, 1885.

Application filed June 25, 1884. Serial No. 135,997. (No model.)

*To all whom it may concern:*

Be it known that I, JEREMIAH J. RICHARDSON, of the city, county, and State of New York, have invented a certain new and useful Improvement in Broilers for Ranges, of which the following is a specification.

My invention relates to certain improvements in broilers for use with ranges having interior grates, which will be first described with reference to the accompanying drawings and then pointed out particularly in the claim.

Referring to the accompanying drawings, which form a part of this specification, Figure 1 represents a perspective view of my improved broiler casing or cover. Fig. 2 is an end view of the same. Fig. 3 is a perspective view of a range, showing my present invention applied.

A represents the broiler-casing before referred to, provided with a handle, $a$, and supporting-piece $a'$. The front or face of the casing is left open at $A'$ for exposing the contents of the broiler to the surface of the grate.
A flange, $A''$, extends around this opening, and is utilized for retaining the broiler in position within the casing. At the outer end the casing is provided with a door, B, through which the broiler is inserted.

In the door B, I provide an opening, $b$, through which the handles of the broiler may extend when in position within the casing.

C C are bridges within the casing, on which the broiler may rest.

When the broiler is first inserted in the casing, it may be placed in a position most convenient for moving it in and out, as shown in dotted lines in Fig. 2, (the door being of course open,) and afterward turned upward against the flanges $A''$ and facing the opening $A'$, as shown in figure. By this means the parts may be more conveniently manipulated.

The broiler is shown in dotted lines at D.
E is a range having an oven, F, the latter being provided with a grate or broiling-surface, G. These parts are shown in the perspective view in Fig. 3.

Although I have shown but one form of my improved broiler-casing, I wish it to be distinctly understood that I do not limit myself to this form, as I may and have constructed them oval-shaped or round both at the top and at the back.

The whole casing may be modified, as far as the shape or contour of the same is concerned, without departing from the spirit of my invention, which is broadly a casing or cover for broilers adapted to be used in connection with ranges, as described. The permanent end and the door B may also be dispensed with, if desired, these spaces in such instances being allowed to remain open.

I am aware that broiler-casings adapted to be placed over stove-lid holes to receive a broiler through the top or one end and expose it to the action of flame and heat passing through said holes are old, and that the same and other broilers have been provided with receptacles for drippings from the meat. I am also aware that upright broiler-casings have been placed before open grates of stoves, having their open faces exposed to said grates, and having means for applying the broiler to the casing either through the open face at top or at back. I am also aware that broilers without casings have been used in ovens of ranges having interior grates. I am also aware that in casings adapted for the broiling of meats transverse bridges have been arranged for supporting the broiler. These several constructions I therefore disclaim.

Having thus described my invention, what I claim as new therein, and desire to secure by Letters Patent, is—

A broiler-casing for ovens provided with interior grates, which consists of an upright inclosing device for the broiler, having an open upright face for exposing the broiler to the grate, and flanges at the sides for preventing the broiler from falling forward, an open end for withdrawing the broiler without removing the casing from the oven, a closed top, back, and inner end, a receptacle in its lower portion for receiving the drippings, and the transverse bridges for supporting the broiler.

J. J. RICHARDSON.

Witnesses:
ERNEST ALSHAGEN,
CHARLES C. BULKLEY.